United States Patent [19]
Levine

[11] 3,936,652
[45] Feb. 3, 1976

[54] POWER SYSTEM
[76] Inventor: Steven K. Levine, 713 Washington St., New York, N.Y. 10014
[22] Filed: Mar. 18, 1974
[21] Appl. No.: 451,755

[52] U.S. Cl............... 290/2; 60/643; 290/1 R; 290/55; 60/682
[51] Int. Cl.² ........................................ F03D 9/00
[58] Field of Search ............... 290/1, 2, 52, 55, 44; 60/682, 650, 643, 645

[56] References Cited
UNITED STATES PATENTS

| | | | |
|---|---|---|---|
| 695,524 | 3/1902 | Woodell | 290/55 |
| 1,013,798 | 1/1912 | Messina | 290/55 |
| 3,070,703 | 12/1962 | Podolny | 290/52 |
| 3,152,260 | 10/1964 | Cummings | 290/52 |

Primary Examiner—G. R. Simmons
Attorney, Agent, or Firm—Peter L. Tailer

[57] ABSTRACT

A heat source heats air which rises in a duct having at least a one hundred meter vertical rise. Cold air enters the bottom of the duct through one or more horizontal passages containing vanes driven by moving air as a power source. The heat source may be a heat exchanger connected to an atomic reactor, a fossil fuel plant, a solar collector, or a geothermal heat supply. The heat exchanger may be located in the duct or in the one or more horizontal passages. In some applications, solar energy may directly heat the duct or a grid therein to cause an air flow.

1 Claim, 10 Drawing Figures

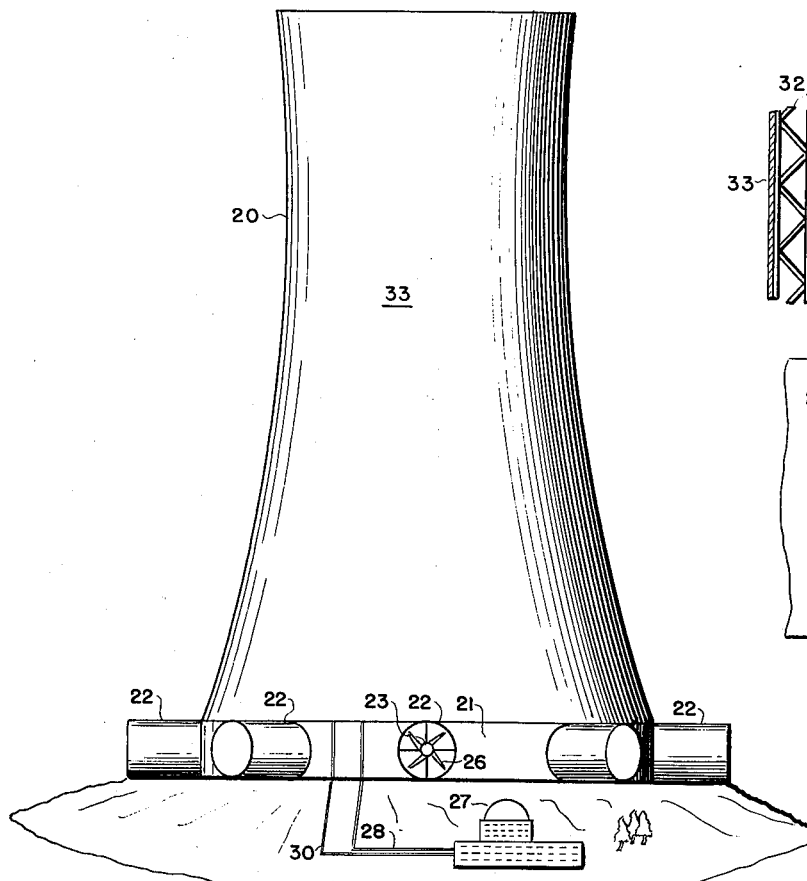
FIG. 1
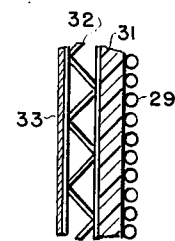
FIG. 2
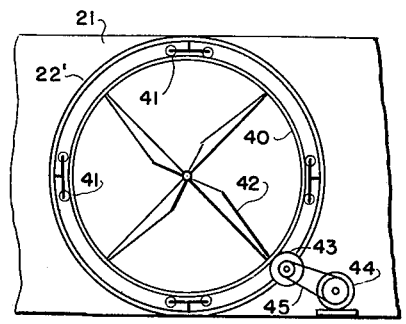
FIG. 4
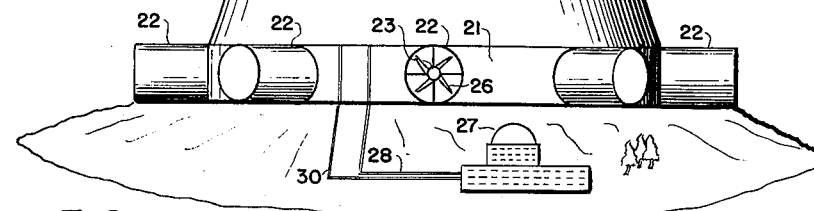
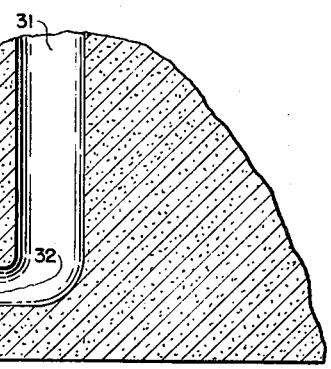
FIG. 5
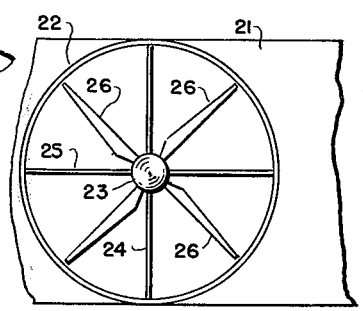
FIG. 6  FIG. 7
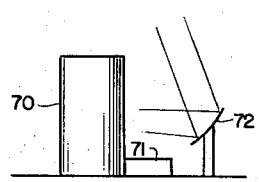
FIG. 8
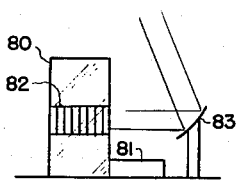
FIG. 9
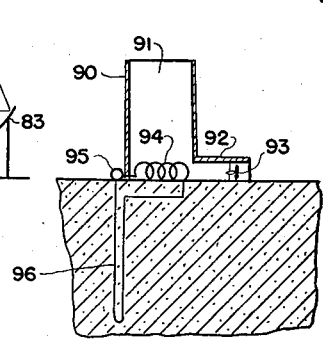
FIG. 10

POWER SYSTEM

BACKGROUND OF THE INVENTION

The conversion of heat to mechanical energy for the generation of electricity or for any other purpose is a basis on which much of our technological society depends. This invention opens up new vistas for the use of waste heat, the use of low temperature heat, and the large scale conversion of any heat to power.

BRIEF DESCRIPTION OF THE DRAWING

FIG. 1 is an elevational view of a power generating system having a tower with horizontal passages leading to the bottom thereof according to my invention;

FIG. 2 is a vertical section through a fragment of the wall of the tower of FIG. 1;

FIG. 3 is an end view of a horizontal passage leading into the bottom of the tower of FIG. 1;

FIG. 4 is an end view of a modified passage similar to that shown in FIG. 3;

FIG. 5 is a vertical section through a mountain mined out to provide a power system according to my invention;

FIGS. 6 and 7 are vertical sections through solar heated power systems;

FIGS. 8 and 9 are side views of solar heated power systems; and

FIG. 10 is a vertical section through a geothermally heated power system.

DESCRIPTION OF THE PREFERRED EMBODIMENTS

As shown in FIGS. 1 through 3, a vertical tower 20 contains a central duct and it rests on a cylindrical base 21. Horizontal passages 22 lead into base 21 to communicate with the central duct of tower 20. Each horizontal passage 22 contains an electric generator 23 mounted on struts 24 and 25. Generator 23 is directly driven by vanes 26 which are turned by moving air. An atomic reactor 27 generates heat, as waste heat or as its main production, which heat is pumped in a working fluid through pipe 28 to the inner coils 29 and returned through pipe 30 after heating air in the interior duct space of tower 20. As shown in FIG. 2, coils 29 are mounted on the insulation 31 which, in turn, is fixed to the support members 32 which are structural. An outer shell or covering 33 forms the outer surface of tower 20.

This invention operates in the following manner. Heated fluid, which may be water under pressure, flows through coils 29 as it is circulated from reactor 27. Other working fluids may be used to provide higher temperatures. The coils 29 heat air within the interior duct space of tower 20 which rises to draw cold air into tower 20 through the horizontal passages 22. In the passages 22, the resulting air flow drives generators 23 to provide power. Tower 20 should be at least one hundred meters high above base 21 to reach a useful range of efficiency.

As shown in FIG. 5, a mountain 30 is mined out to provide a vertical duct 31 and a horizontal passage 32 leading to the bottom thereof. Pipes 33 and 34 conduct a hot working fluid to and from coil 35 to heat air thereby. A wind driven generator 36 is positioned in passage 32. In many locations, a vertical duct 31 may be constructed in a mountain which could have a vertical rise of one thousand meters or more. The vertical rise could be extended by placing a tower about the top of the duct. This large vertical rise will provide a very high wind velocity through the system with a resultant high power production even if the air therein is only heated 20 or 30° C.

FIG. 4 shows a horizontal passage 22' which contains a ring 40 rotatably supported by the rollers 41. Ring 40 has a propeller 42 fixed therein so that wind will rotate the propeller 42 and thereby the ring 40. A roller 43 contacts ring 40 to be driven thereby and rotate generator 44 by means of a pulley and belt transmission 45. Any suitable transmission may be used to enable ring 40 to drive generator 44.

FIG. 6 shows a tower 50 containing a vertical duct 51 and a horizontal passage 52. A tracking reflector 53 concentrates solar energy at a focus 54 to heat a working fluid to a high temperature. This fluid is pumped to circulate through coils 55 to heat air to drive the wind powered generator 56.

FIG. 7 is substantially the same as FIG. 6 except that air in duct 61 of tower 60 is heated by the circulation of a lower temperature working fluid through coil 65 and the direct black sun heated element 64 to drive the wind powered generator 66.

FIG. 8 shows a tower 70 having a vertical passage 71 connected thereto. Tower 70 is itself heated by the sun's rays that are directed to it by one or more reflectors 72. The heated tower 70 heats air therein to cause an air flow and drive a generator.

FIG. 9 shows a transparent tower 80 with a horizontal passage 81. A grid 82 within tower 80 is heated by reflected light from solar collectors 83 to heat air within tower 80 and cause an air flow.

FIG. 10 shows a tower 90 containing duct 91 and horizontal passage 92 containing wind generator 93. Coils 94 have a hot working fluid pumped through them by pump 95 from a deep well 96 which has the working fluid circulated through it to pick up geothermal heat. Where geothermal sources provide hot water or steam, these may be directly passed through coils 94.

While the generation of electricity has been described as the power output produced by the wind driven propellers of this power system, the propellers could be used to drive pumps to pump water to a higher elevation for a pumped water energy storage application. Although the duct has been described as being vertical, it may slope provided its vertical rise is at least one hundred meters. The air heating coils may be any suitable heat exchange devices which may be located in the duct, in one or more passages entering the duct, or in both the duct and passages. The vanes or propellers driven by moving air are preferably located in the passages where they can be of reasonable size and easily installed and maintained.

While this invention has been shown and described in the best forms known, it will nevertheless be understood that these are purely exemplary and that modifications may be made without departing from the spirit of the invention.

I claim:

1. A power system comprising, in combination, a tower containing a single interior duct having a vertical rise of at least one hundred meters, passages leading to the bottom of the duct, insulation lining said duct, heating coils mounted on the inner side of said insulation, said heating coils heating air to rise in said duct and draw additional air in through said passages, an atomic reactor, a working fluid circulating between said atomic reactor and said heating coils, generators, and rotatably mounted vanes disposed in said passages driven by air passing through said duct and said passages, said vanes driving said generators providing power.

* * * * *